UNITED STATES PATENT OFFICE.

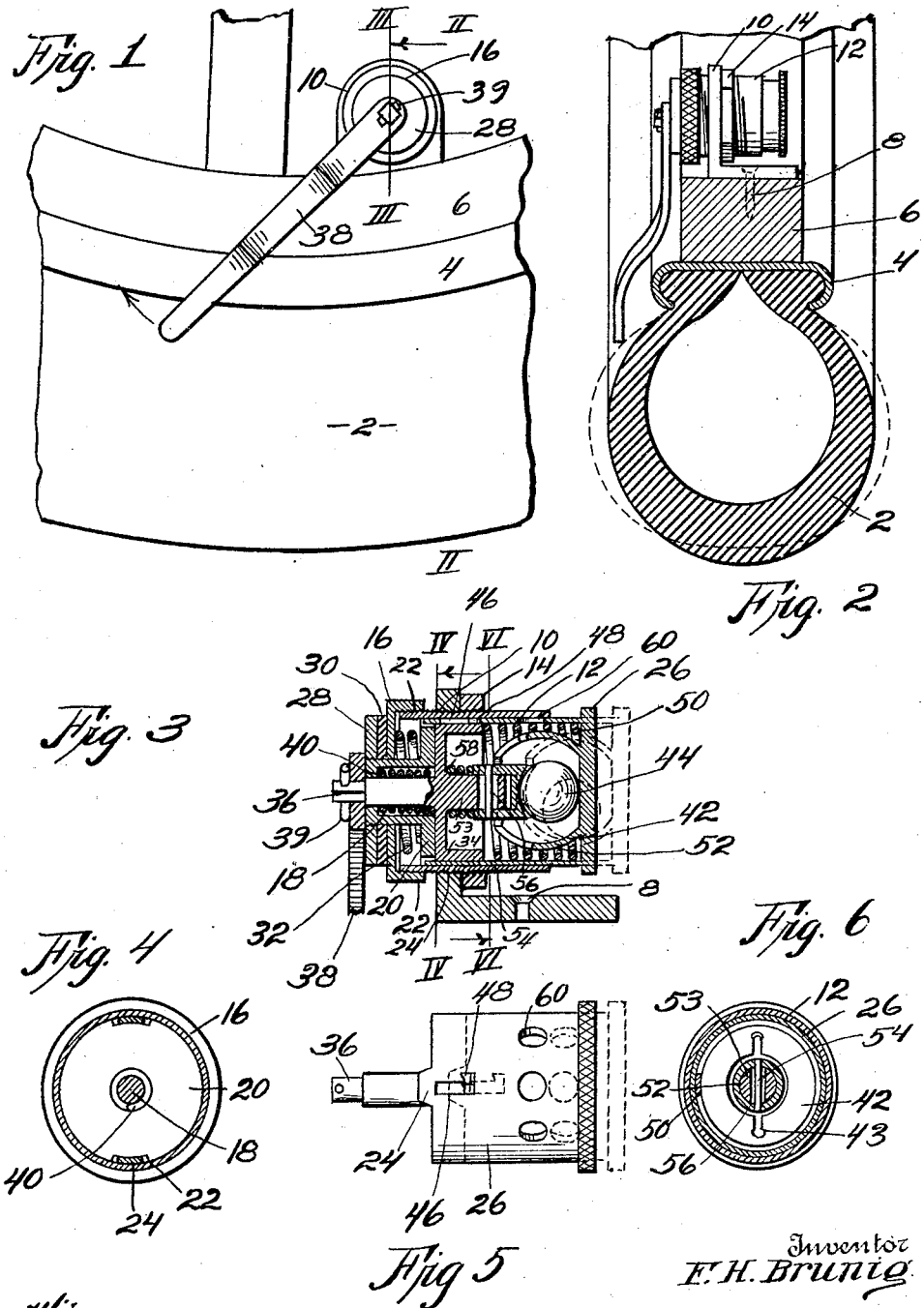

FREDERICK H. BRUNIG, OF KANSAS CITY, MISSOURI.

PNEUMATIC-TIRE-DEFLATION SIGNAL.

1,411,705.  Specification of Letters Patent.  Patented Apr. 4, 1922.

Application filed May 31, 1921. Serial No. 473,667.

*To all whom it may concern:*

Be it known that I, Dr. FREDERICK H. BRUNIG, a citizen of the United States, and resident of Kansas City, county of Jackson, State of Missouri, have invented a certain new and useful Improvement in Pneumatic-Tire-Deflation Signals, of which the following is a complete specification.

This invention relates to tire signals of that class which produce an audible signal notifying the driver of a motor car when a tire is becoming deflated.

One of the objects of the invention is to produce a device of this character which may be adjusted, with a slight modification, for use with all sizes of tires.

A further object is to produce a tire signal which may be adjusted to ring at varying degrees of deflation of a tire.

A still further object is to produce a device of this character of simple, strong, durable, efficient and inexpensive construction; and in order that it may be fully understood, reference is to be had to the accompanying drawing, in which:

Figure 1 is a side view of a portion of an automobile wheel equipped with the invention.

Figure 2 is a section on the line II—II of Figure 1.

Figure 3 is a section on the line III—III of Figure 1, on an enlarged scale.

Figure 4 is a section on the line IV—IV of Figure 3.

Figure 5 is a top plan view of a part of the device.

Figure 6 is a section on the line VI—VI of Figure 3.

In the said drawing, where like reference characters identify corresponding parts in all of the figures, 2 is an automobile tire, 4 the rim, and 6 the felly of an automobile wheel of common and well-known construction.

Secured to the inner face of the felly by means of a plurality of screws 8 is a right-angle shaped bracket 10 provided with a threaded opening in its vertical leg. 12 is a hollow cylinder threaded exteriorly from one end for substantially three-fourths its length and adapted to engage the threaded opening in bracket 10, a lock nut 14 being threaded on said cylinder and abutting the bracket to hold the cylinder from turning movement.

The front end of the cylinder is closed by a screw cap 16 which is centrally perforated for the passage of a tubular member 18 provided at its inner end with an enlarged disk 20, said disk being provided with a pair of peripheral notches 22 for the reception of a pair of ears 24 formed on a sleeve 26 open at one end and closed at the other, the open end telescopically entering the end of cylinder 12, the construction being such that turning movement applied to the sleeve 26 will impart such movement to the member 18 through cooperation of the ears and notches, as will hereinafter appear.

The member 18 is threaded at its outer end and exteriorly to cap 16 receives a threaded disk 28 which holds in position against the cap 16 a friction disk 30 of leather or the like. Fitting around member 18 and pressing against disk 20 and the inner face of screw cap 16 is an expansion spring 32, which by applying pressure on disk 20 will always maintain the disk 28 pressed inwardly against cap 16, and through the engagement of the friction disk 30 with said cap prevent rotation of tubular member 18 as will be readily understood.

Slidingly engaging the inner face of the sleeve 26 is a flange 34 which abuts the inner face of disk 20 and carries a shaft 36 which projects through member 18 exteriorly of the device, and is squared at its outer end for the reception of an operating arm 38, held in position by means of a pin 39. The curvature and length of the arm will be controlled by the size of the tire, which is adapted to operate it when the tire is deflated to a predetermined point (see Figure 2), as described below.

Surrounding the shaft 36 and pressing against the end of member 18 at one end, and against the flange 34 at the other, is a spring 40, which by grasping inwardly on the flange 34 will always maintain the lever pressed against the face of disk 28 so that it shall be held pressed against said disk to overcome any rattling it might otherwise produce.

Formed on the internal face of the closed end of the sleeve 26 is a gong 42 provided with a series of slots 43 for resonant purposes as customary in gongs, and within said gong is a ball clapper 44 which, by rattling around in the gong, will produce an audible signal for notifying the driver, as will hereinafter appear.

Sleeve 26 is provided with one or more right-angle shaped slots 46 (one only appearing) in which is engaged a pin 48 projecting outward from flange 34 and within said sleeve and abutting its closed end at one end and flange 34 at the other, is an expansive spring 50 tending to maintain the sleeve in the dotted line position as shown in Figure 3, it being understood, however, that when the pin 48 is in engagement with the offset portion of slot 46 that the sleeve will be held in the full line position, same figure. When the parts occupy this position ears 24 will be engaged in the notches 22 of disk 20 and therefore, turning movement of shaft 36 through the instrumentality of the operating arm 38 contacting with a deflated tire, will cause the pin 48 to be tripped from the offset portion of slot 46 and will permit the sleeve 26 under the action of its spring 50 to move to dotted line position (Figure 3).

Under normal conditions the ball clapper is held against the concave end of a tubular member 52 slidingly receiving at its inner end an extension 53 of shaft 36. The extension is provided with a slot 54 for engagement by a pin 56 carried by member 52 for limiting the movement of the latter, and surrounding said extension and abutting the end of member 52 at one end, and flange 34 at the other, is an expansion spring 58 which will maintain the ball pressed against the closed end of sleeve 26, and will thus hold it against rattling and producing a signal. It will be understood, however, that this construction may be dispensed with as the parts may be proportioned so that the ball will be held between the closed end of the sleeve 26 and the extension 53. Sleeve 26 is provided with a series of openings 60 for the clearer emission of sound produced by the ball to more easily escape and attract the attention of the operator of the car to the deflated tire.

The operation of the device is as follows: To set the device in operative position, pressure is applied on the closed end of the sleeve 26 to force it inwardly against the action of its spring 50, this action placing the device in the full line position shown in Figure 3, and then a slight rotative movement is given said sleeve to engage the offset portion of its slot 46 with pin 48. The device is now in operative position and when a tire begins to deflate, the bulge of the same, as shown by dotted lines in Figure 2, will impart a slight upward movement to the operating arm 38 which will rotate flange 34 and disengage the pin of said flange from the offset portion of slot 46 of sleeve 26, which sleeve will immediately spring outwardly and free the ball from its concave seat in member 52 and permit it to rattle within the gong under the travel of the car and thus notify the driver of the deflating condition of the tire. To reset the device the sleeve 26 is pushed inward to reengage the ears 24 with the peripheral notches 22, and the lever is moved slightly downward to its original position, this action resetting the pin in the offset portion of slot 46.

When it is desired to set the operating arm at a different angle in order that a greater or smaller degree of deflation will be necessary to trip the device for operation, sleeve 26 is pushed inwardly against the action of its spring 50, and through the engagement of its ears 24 with notches 22 of disk 20, and the abutment of pin 48 with the end of slot 46, will cause flange 34 to press against disk 20, which will move outward compressing the spring 32 and carrying disk 28 outward and relieving the engagement of friction disk 30 with the exterior face of the fixed cap 16, thus permitting rotation of all of the members except screw cap 16 and cylinder 12 as will be readily understood. As soon as the pressure applied against the sleeve 26 is removed, the friction disk will reassume its position and the members will be locked against rotation, and the device will be ready for operation, as hereinabove described.

It will be apparent that the device of the invention is practically mud, dust and water proof and that it will never become inoperative by the entry of such elements within the sleeve. When the sleeve is extended, of course, dust may enter, but such open condition will be immediately remedied by the driver giving the deflating tire the proper attention.

From the above description it will be apparent that I have produced a device of the character described which possesses all of the features of advantage set forth as desirable, and while I have described and claimed the preferred embodiment of the same I reserve the right to make all changes properly falling within the spirit and scope of the appended claims.

I claim:

1. A tire signal, comprising a cylinder in fixed relation to the felly of a wheel, a sleeve in said cylinder, an alarm in said sleeve, a catch on said sleeve, a shaft in said cylinder, a flange projecting from said shaft, a latch on said flange for cooperation with the catch of said sleeve, and an operating arm on said shaft for unlatching the sleeve and placing the alarm in operative position.

2. A tire signal, comprising a cylinder carried by the felly of a wheel, a sleeve telescoping in said cylinder, an alarm in said sleeve, a catch on said sleeve, a spring in said cylinder tending to maintain the sleeve in extended position, a shaft in said cylinder, a flange on said shaft, a latch on said flange for cooperation with the catch of the sleeve, and an operating arm on said shaft adapted to trip the latch from engagement with the catch and permit the said spring to extend the sleeve for releasing the alarm.

3. A tire signal, comprising a cylinder carried by the felly of a wheel, a sleeve telescoping in said cylinder, a gong carried by said sleeve, a catch carried by said sleeve, a shaft in said cylinder, a flange on said shaft, a latch on said flange, a spring tending to maintain the sleeve in extended position and placing the gong in operative condition, and an operating arm on said shaft for actuation by a deflating tire.

4. A tire signal, comprising a cylinder carried by the felly of a wheel, a sleeve telescoping in said cylinder, a gong carried by said sleeve, a clapper in said gong, means in said sleeve for maintaining the clapper in inoperative position, a catch on said sleeve, a shaft in said cylinder, a flange on said shaft, a latch on said flange, a spring for maintaining the sleeve in its extended position and releasing the clapper for operation when the latch is tripped from the catch, and an operating arm on said shaft for contact by a deflating tire.

5. A tire signal, comprising a cylinder carried by the felly of a wheel, a sleeve closed at one end in said cylinder, a gong carried by said sleeve, a clapper in said gong, means adapted for maintaining the clapper in inoperative position, a catch carried by said sleeve, and a latch adapted to be operated by a deflating tire for releasing said catch and placing the clapper in operative position.

6. A tire signal, comprising a cylinder carried by the felly of a wheel, a sleeve closed at one end and telescoping in said cylinder, an alarm in said sleeve, a catch carried by said sleeve, a shaft in said cylinder, a flange on said shaft, a latch on said flange, an operating arm on said shaft for contact by a deflated tire, and means for yieldingly maintaining the flange against rotation.

7. A tire signal, comprising a cylinder carried by the felly of a wheel, a sleeve closed at one end and telescoping in said cylinder, an alarm in said sleeve, a spring adapted to maintain said sleeve in extended position, a catch carried by said sleeve, a shaft in said cylinder, a flange on said shaft, a latch on said flange, and means operated by a deflating tire for tripping the latch from the catch and permitting the sleeve to move to its extended position to free the alarm for operation.

8. A tire signal comprising a cylinder carried by the felly of a wheel, a sleeve closed at one end and telescoping in said cylinder, an alarm in said sleeve, a catch carried by said sleeve, a shaft in said cylinder, a flange on said shaft, a latch on said flange, an operating arm for contact by a deflating tire mounted on said shaft, a friction disk for maintaining the shaft against rotation, and a spring adapted to maintain said friction disk in operative position.

9. A tire signal comprising a cylinder carried by the felly of a wheel, a sleeve closed at one end and telescoping in said cylinder, a gong carried by said sleeve, a clapper in said gong, a spring for normally maintaining the clapper against movement, a second spring for normally maintaining the sleeve in its extended position, a catch on said sleeve, a shaft mounted in the cylinder, a flange on said shaft, a latch on said flange, an operating arm for contact with a deflating tire mounted on said shaft, and yielding means adapted to maintain said shaft against rotation.

10. A tire signal, comprising a cylinder in fixed relation to the felly of a wheel, a sleeve in said cylinder, an alarm in said sleeve, a catch on said sleeve, a shaft in said cylinder, a flange projecting from said shaft, a latch on said flange for cooperation with the catch of said sleeve, an operating arm on said shaft for unlatching the sleeve, means interposed between said arm and said flange, and a spring applying pressure on said last-named means and said flange to hold said arm pressed firmly against the former.

In witness whereof I hereunto affix my signature.

FREDERICK H. BRUNIG.